(12) United States Patent
Dickerson

(10) Patent No.: US 9,776,377 B2
(45) Date of Patent: Oct. 3, 2017

(54) SHELF TALKER LABEL, A SHEET AND A ROLL OF SUCH

(71) Applicant: UPM Raflatac Oy, Tampere (FI)

(72) Inventor: Paul Dickerson, Arden, NC (US)

(73) Assignee: UPM RAFLATAC OY, Tampere (FI)

( * ) Notice: Subject to any disclaimer, the term of this patent is extended or adjusted under 35 U.S.C. 154(b) by 22 days.

(21) Appl. No.: 14/572,846

(22) Filed: Dec. 17, 2014

(65) Prior Publication Data

US 2016/0176159 A1  Jun. 23, 2016

(51) Int. Cl.

| | |
|---|---|
| *B32B 7/06* | (2006.01) |
| *B32B 29/00* | (2006.01) |
| *B32B 7/12* | (2006.01) |
| *G09F 3/10* | (2006.01) |
| *G09F 3/02* | (2006.01) |
| *G09F 3/20* | (2006.01) |
| *B32B 29/02* | (2006.01) |

(52) U.S. Cl.
CPC ............... *B32B 7/06* (2013.01); *B32B 7/12* (2013.01); *B32B 29/02* (2013.01); *G09F 3/02* (2013.01); *G09F 3/10* (2013.01); *G09F 3/204* (2013.01); *B32B 2307/402* (2013.01); *B32B 2307/412* (2013.01); *B32B 2307/75* (2013.01); *B32B 2519/00* (2013.01); *G09F 2003/0201* (2013.01); *G09F 2003/0223* (2013.01); *G09F 2003/0226* (2013.01); *G09F 2003/0241* (2013.01)

(58) Field of Classification Search
CPC . G09F 3/02; G09F 3/10; G09F 3/0288; G09F 3/204; G09F 2003/0201; G09F 2003/0223; G09F 2003/0226; G09F 2003/0241; Y10T 428/14; Y10T 428/15; Y10T 428/1476; Y10T 428/1495; Y10T 428/149; Y10T 428/1486; Y10T 428/24777; Y10T 428/24793; Y10T 156/1057; B32B 7/06; B32B 7/12; B32B 29/02; B32B 2519/00; B32B 2307/75; B32B 2307/412; B32B 2307/402

See application file for complete search history.

(56) References Cited

U.S. PATENT DOCUMENTS

| | | | | |
|---|---|---|---|---|
| 5,631,078 | A * | 5/1997 | Ellery | B41M 7/0027 428/195.1 |
| 5,667,858 | A * | 9/1997 | Pokorny | C09J 7/0214 428/343 |
| 6,004,643 | A * | 12/1999 | Scheggetman | G09F 3/10 283/81 |

(Continued)

*Primary Examiner* — Patricia L Nordmeyer
(74) *Attorney, Agent, or Firm* — Cantor Colburn LLP

(57) ABSTRACT

A laser printable shelf talker label sheet includes one or more removable shelf talker labels. The shelf talker label sheet includes a printable face layer laminated to a support layer, and one or more die cut removable shelf talker labels. The one or more shelf talker labels include at least the printable face layer having a first information portion and a second information portion, the support layer being adhesively attached to the face layer portion corresponding to the second information portion, the support layer portion being detachably attached to the face layer portion corresponding to the first information portion, and the printable face layer including optically transparent, fiber based material. A roll including one or more printable, die-cuttable shelf talker labels is also described.

23 Claims, 2 Drawing Sheets

(56) References Cited

U.S. PATENT DOCUMENTS

| | | | |
|---|---|---|---|
| 8,261,477 B1* | 9/2012 | Wilkinson | G09F 3/10 283/81 |
| 2002/0102377 A1* | 8/2002 | Chess | G09F 3/204 428/40.1 |
| 2005/0126060 A1* | 6/2005 | Rawlings | G09F 3/0288 40/661.03 |
| 2006/0010743 A1* | 1/2006 | Fowler | G09F 3/10 40/638 |
| 2007/0059475 A1* | 3/2007 | Dunn | B32B 3/08 428/40.1 |
| 2008/0188814 A1* | 8/2008 | Lavi-Loebl | A61M 5/28 604/189 |
| 2012/0018098 A1* | 1/2012 | Henderson | B32B 7/12 156/703 |
| 2012/0037304 A1* | 2/2012 | Saint | B42D 15/00 156/247 |

* cited by examiner

SHELF TALKER LABEL, A SHEET AND A ROLL OF SUCH

TECHNICAL FIELD

The application relates to a printable shelf talker label, a roll comprising one or more printable, die-cuttable shelf talker labels and a sheet comprising one or more printable shelf talker labels.

BACKGROUND

A shelf talker label is attachable to a shelf. Typically shelf talker labels are attached to hang from the front edge of a shelf. A shelf talker label may show information on a product on the shelf, on which it is attached to. Shelf talker labels are typically intended to inform a customer and/or to call for customer's attention. A shelf talker label may comprise information, for example price information. Shelf talker labels may comprise sign or print which aims to be eye-catching. The shelf talker label may be utilized to stand out, catch attention and/or provide information.

A traditional shelf talker label comprises a transparent plastic portion through which the previous information, for example earlier price, is visible. The shelf talker label may provide additional information on earlier status or situation and new status or situation. Plastic containing shelf talker labels are not environmentally ideal.

SUMMARY

A shelf talker label can provide information on previous and new status or situation. This enables comparison between new and previous information. Shelf talker labels may comprise a translucent portion via which previous information is visible. Environmental issues are important to be taken into account with shelf talker labels.

According to an embodiment a shelf talker label comprises a face layer and a support layer. The face layer comprises a printable information surface and an adhesive surface. The printable information surface comprises a first information portion and a second information portion. The support layer is adhesively attached to an adhesive surface portion of the face layer opposite to the second information portion. An adhesive surface portion of the face layer opposite to the first information portion is adhesively attachable. The printable face layer comprises optically transparent, fiber based material.

According to an embodiment a laser printable shelf talker label sheet comprises one or more removable shelf talker labels, wherein the shelf talker label sheet comprises a printable face layer laminated to a support layer. The shelf talker label sheet comprises one or more die cut removable shelf talker labels. The one or more shelf talker labels comprise at least the printable face layer comprising a first information portion and a second information portion, the support layer being adhesively attached to the face layer portion corresponding to the second information portion, the support layer portion being detachably attached to the face layer portion corresponding to the first information portion, and the printable face layer comprising optically transparent, fiber based material.

According to an embodiment a roll of label comprises a face layer and a support layer, wherein the roll of label is arranged to be die-cuttable. The roll of label comprises a printable face layer laminated to a support layer via adhesive and the printable face layer comprises optically transparent, fiber based material.

An embodiment comprises use of a printable, optically transparent, fiber based material as a face layer of a shelf talker label.

DESCRIPTION OF THE DRAWINGS

In the following embodiments are described with the accompanying drawings of which.

DETAILED DESCRIPTION

Store shelves typically comprise items for purchase. Information of the items may situate in front edges of shelves. For example a sale indication, information on products and/or price information may be presented in the front edge of a shelf. Product information may occasionally need an update. Shelf talker labels may be used on store shelves in order to provide information and/or updated information in addition to previous or existing information. A shelf talker label comprises a translucent or a transparent portion, which may be attached onto the previous information. This enables to see-through the previous information. A shelf talker label comprises a less-translucent portion comprising printed new information. Both new and previous information are visible, after the shelf talker label is attached onto a previous information tag. This enables providing information on updated information in relation to former one. Shelf talker labels may provide easy and handy way to update existing data. Shelf talker labels enable providing updated information in addition to antecedent information history, and the relationship between the newly updated and the previous information. Shelf talker labels enable fast and handy way to provide and publish new, updated information and progress of information. Shelf talker labels enable fast and easy way to update existing information on shelf edges, for example. Traditionally shelf talker labels have been made of transparent plastic, like vinyl plastic. More environmentally sustainable shelf talker labels are desired. Fast and easy use enables information to be constantly and/or temporarily updated with shelf talker labels. Thus amount of used shelf talker labels may be remarkable. Recycling and environmental aspects are influenced in corresponding amounts.

Figure 1:
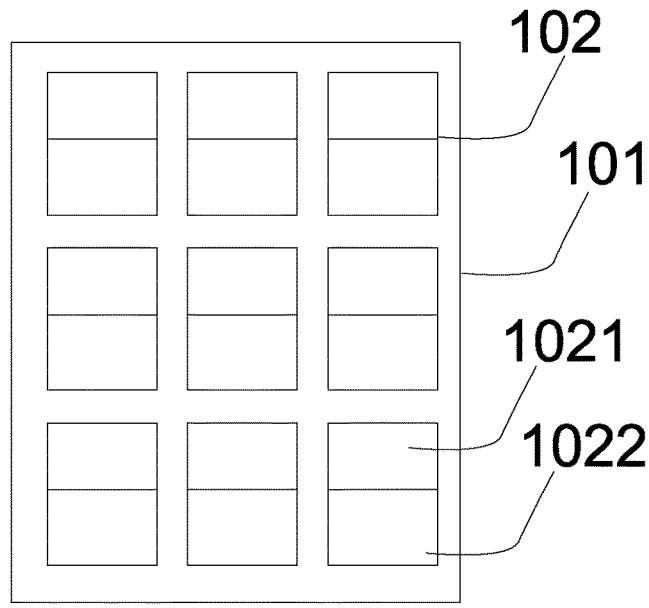
FIG. 1 illustrates a sheet of shelf talker labels according to an embodiment.

FIG. 1 illustrates a sheet of shelf talker labels according to an embodiment. The sheet 101 can comprise size of a standard paper sheet, for example A4 (210 mm×297 mm) according to ISO-216 standard, or 8.5×11 inches (215.9 mm×279.4 mm) according to ANSI (A) standard, or 8×10 inches (203.2 mm×266.7 mm). The sheet 101 may comprise any size, preferably a size suitable for a printer. The sheet 101 may comprise several shelf talker labels 102. The shelf talker labels 102 or the sheet 101 comprise a printable front surface. Shelf talker labels 102 may comprise one or more printable portions 1021, 1022. The printable surface portion(s) may be printed using a printer, for example a laser printer.

The sheet 101 comprises a printable face layer. A support layer is adhesively attached to the face layer, opposite to its printable front surface. The support layer is detachably attached to a first portion 1021. The support layer is permanently attached to a portion second 1022. The labels 102 are printable and removable from the sheet 101. The face layer is die-cut along external dimensions of each label 102. Each label 102 illustrated in the FIG. 1 is detachable from the sheet 101. The support layer is die-cut along shape of the second portion 1022, but along lines separated from the die-cut line of the face layer. The sheet 101 is not through cut or perforated. The die-cut lines on the face layer are separated from any die-cut lines on the support layer. The die-cut lines of the parallel superposed layers do not encounter each other. Towards the surface of the sheet 101, the die-cut lines of the face layer and the support layer are separated from each other. The separation is small, order of millimeters or less. The die-cut lines enable removal of the shelf talker labels 102 from the sheet 101. The non-crossing die-cut lines of the layers of the sheet 101 enable maintaining the die-cut sheet as one piece, as a whole sheet. For example printing the sheet 101 is enabled without damaging structure of the sheet 101 or labels 102; or without separating labels or parts of such from the sheet.

A sheet 101 of shelf talker labels may comprise clear or pre-printed printable shelf talker label labels. Sheet of the shelf talker labels comprises a printable front surface, which is optionally pre-printed. Sheet of shelf talker labels comprise a support layer or a backside layer(s), which is attached via adhesive to the face layer surface opposite to the printable front surface. The structure is described in more details with the FIG. 3.

Figure 2A:
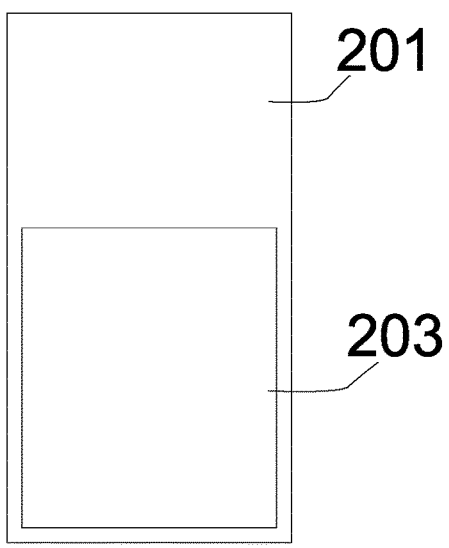
FIG. 2a illustrates a shelf talker label according to an embodiment.

FIG. 2a illustrates a shelf talker label according to an embodiment. The label of the FIG. 2a is removed from the sheet 101. The label comprises a face layer 201 and a support layer 203. The label is removed from the sheet 101 of the FIG. 1 along die-cut lines of the face layer and of the support layer. After removal, the sheet 101 comprises a through hole in place of the portion 1022 and a support layer in place of the first portion 1021. The label of the FIG. 2a comprises a face layer having a printable front surface and an opposing surface. The opposing surface of the face layer comprises a portion attached to a support layer and a portion detached from the support layer. The latter support layer portion is thus remaining in the sheet 101 of the FIG. 1. The portion detached from the support layer reveals adhesive and forms a adhesive, tacky portion of the label of the FIG. 2a. The shelf talker label is attachable via adhesive. The portion attached to the support layer 203 is arranged to form an information area at the printable front surface. The portion detached from the support layer 203 comprises smaller opacity compared to the portion attached to the support layer 203.

The shelf talker label of the FIG. 2a shows a face layer 201 and a support layer 203. The support layer 203 is attached to a portion of the label, which approximately corresponds to the second portion 1022 of the FIG. 1. The face layer of the label has been detached along die-cut line, for example perforations, of the face layer of the sheet of the FIG. 1. The support layer has been detached along die-cut line, like perforations, of the support layer of the sheet of the FIG. 1. The support layer 203 has smaller area compared to the face layer 201. The support layer 203 corresponds to shape of one of the two portions of the face layer 201. The support layer 203 has smaller dimensions compared to the face layer 201. The support layer 203 comprises at least 1 mm, or at least 1-5 mm, or at least 2-4 mm shorter straight sides of a rectangle in the FIG. 2a. The external dimensions of the support layer are at least 1-5 mm smaller, or 2-4 mm smaller compared to the external dimensions of the face layer. The external dimensions of the support layer 203 correspond to the shape of the external dimensions of the second portion 1022 of the face layer, to which the support layer 203 is attached to. The external dimensions of the support layer 203 are 1-5 mm smaller, or 2-4 mm smaller than the external dimensions of the second portion 1022 of the face layer in each areal dimension, for example in relation to each straight side of a rectangle shaped face layer portion.

Figure 2B:
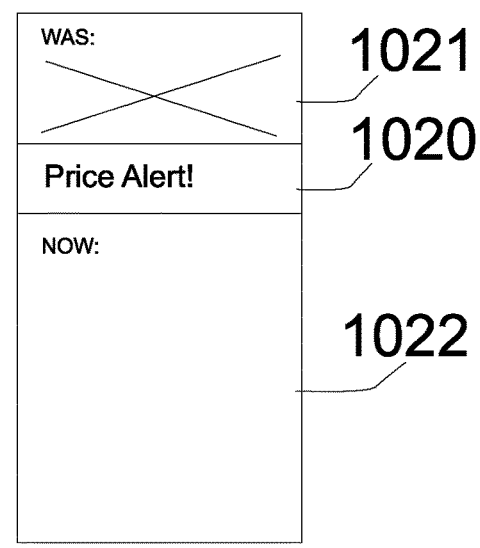
FIG. 2b illustrates a shelf talker label according to an embodiment.

FIG. 2b illustrates a shelf talker label according to an embodiment. The shelf talker label comprises a face layer. The face layer comprises a single layer structure. In alternative embodiment a face layer comprises a multilayer structure. The face layer comprises a continuous, homogenous structure. The front surface of the face layer illustrated in the FIG. 2b comprises three portions 1021, 1020, 1022. The front surface of the shelf talker label comprises a printable surface. On the opposite side, the shelf talker label comprises a back surface.

The printable front surface of the face layer is arranged to receive a print. According to an embodiment the printable surface of the shelf talker label comprises laser printable surface. Information may be printed by a printer or in addition/alternatively hand-written to the front surface of the face layer. Information may be printed by a laser printer, or by any other suitable printer. The printable surface can receive a print via laser printing, rotary printing, offset printing, gravure printing, flexography-, inkjet-, screen-printing, thermal printing, or any other kind of printing process. In addition or alternatively, the printable surface can be hand printed, for example using ink, colour pen, ball-point, fountain pen, or alike. The portion 1022 may be used for presenting updated information, like a new price information. The portion 1022 is able to receive a print and another shelf talker label, which is attachable to it.

Portion 1022 of the printable surface is preferably less transparent compared to the other area(s) of the printable surface of the shelf talker label. The opacity of the portion 1022 is bigger compared to the other area(s) 1020, 1021. According to an embodiment the portion 1022 comprises colour in the face layer material and/or in the adhesive. This provides contrast between the label portion 1022 and the information printed onto it. According to an embodiment the portion 1022 comprises a non-transparent support layer attached to it. The support layer is firmly attached to the portion 1022. Thus, the support layer and the face layer are arranged to stay attached to each other at the area of the portion 1022. For example during use of the shelf talker label the face layer and the support layer remain attached to each other at the area of the portion 1022, while other portion(s) of the face layer of the shelf talker label may be detached from the support layer during use.

The portion 1020 is optional. It may be created by printing. Portion 1020 may be created during the printing phase, for example on edge of either of the portions 1022, 1021 or in between the portions 1022, 1021. Transparency of the portion 1020 may correspond to transparency of the portion 1022 or to transparency of the portion 1021. The portion 1020 may comprise a printable or a pre-printed front surface. The printed portion 1020 can be used for harmonizing used shelf talker labels and/or for catching attention. For example the portion 1020 is printed to make the shelf talker label identifiable, recognizable, visible and/or alerting. The front surface of the portion 1020 comprises a print, which is arranged to identify a store, a product, a product group, a shelf, information type, or alike. The portion 1020 may be fully printed, for example colour printed.

The portion 1021 of a printable front surface comprises a print or no print. The front surface portion 1021 is typically used as partially printed. For example a short text and/or a cross across an area of it is printed on the portion 1021. The face layer portion 1021 comprises a back surface opposite to the printable front surface. In a sheet of the FIG. 1 the back surface of the portion 1021 is detachably attached to a support layer via adhesive. The support layer is arranged to form a release liner for the portion 1021. Adhesive is arranged opposite to and/or on the backside of the printable surface of the portion 1021. Adhesive is arranged to overlay backside of the printable surface of the portion 1021, and release liner (support layer) is arranged to overlay the adhesive. The release liner (support layer) on the back surface of the portion 1021 is detached in order to reveal the adhesive on the back surface, before attaching the shelf talker label. The face layer portion 1021 is translucent. The portion 1021 is arranged to be attached onto existing information, onto an existing tag or label, for example. The existing information, below the attached portion 1021, is visible through the portion 1021, attached onto it.

The opacity of the portion 1021 is smaller compared to the opacity of the portion 1022 of the shelf talker label. The opacity of the portion 1021 is 3-30% smaller compared to the opacity of the portion 1022. Preferably opacity of the portion 1021 is 10-30% smaller compared to the opacity of the portion 1022. More preferably opacity of the portion 1021 is 5-10% smaller compared to the opacity of the portion 1022. According to an embodiment opacity of the portion 1021 is 3-5% smaller compared to the opacity of the portion 1022. The homogenous face layer is employed. Increased opacity is implemented with colour printed on either side of the face layer in the portion 1022. Alternatively or additionally opacity of the portion 1022 is increased with coloured adhesive. According to an embodiment a coloured background is arranged to the portion 1022, for example via coloured face layer and/or coloured support layer attached to it.

According to an embodiment the portion 1021 comprises 5-50% of the total area of the shelf talker label front surface. The portion 1022 comprises 95-50% of the total area of the shelf talker label front surface. One portion of the shelf talker label is adhesive or tacky, comprising adhesive on its back surface. This enables providing a self-adhesive label. Another portion of the shelf talker label is non-adhesive, comprising a support layer attached to it. This enables providing an information portion with opacity. The front surface portions may be divided and/or created via printing. Different information portions can serve as different portions of the face layer. Also, single portion can comprise several different kind of prints and division of those, like colour, text, graphs, figures, etc. The face layer front surface may comprise no print, but provide a printable surface. Different portions can be formed by printing the surface, for example by the user. The portions may be pre-printed or partly pre-printed. For example, the portion 1021 may comprise a print and the portion 1022 may comprise no print. The information portion 1022 is typically provided without a print or partly printed. The portion 1022 is printable by the user. The optional portion 1020 may be pre-printed or created by the user by printing. In an embodiment, the tacky portion 1021 and the information portion 1022 comprise 50:50 area of the label face layer. The portions comprise the same or closely similar dimensions, like size and shape. This enables use of multiple shelf talker labels in chain such that adhesive portion of new one (latest) is attached onto information portion of the older one (previous).

Face layer of the shelf talker label can be made as a single layer or multilayer construction. The face layer of the shelf talker is homogenous, or made of the same material(s). The material may be translucent or transparent. The face layer surface opposite to the printable front surface is adhesively attached to a support layer. An adhesive portion (1021 in the FIG. 2b) is detachably attached to a support layer. The information portion (1022 in the FIG. 2b) is adhesively attached to a support layer. The support layer is typically not transparent, preferably not translucent. The information portion of a shelf talker label is not translucent.

Figure 3:
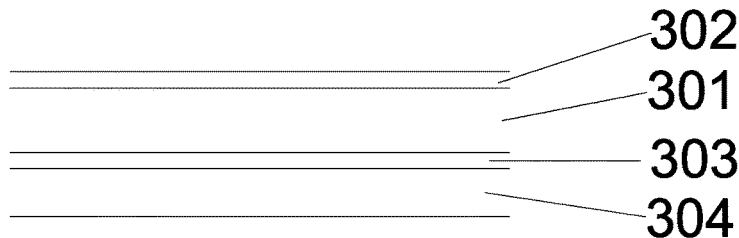
FIG. 3 illustrates a side view of a shelf talker label structure according to an embodiment.

FIG. 3 illustrates a side view of a shelf talker label structure according to an embodiment. Similarly, a sheet of shelf talker labels may comprise similar structure. The shelf talker label comprises a face layer 301. The face layer 301 comprises optically transparent fiber based material. The face layer 301 is translucent or transparent or semi-transparent. Optical transparency enables use as a shelf talker label providing previous and updated information. Information history or continuum information can be provided using the labels. Instead of previous plastic face stocks, fiber based material is used as a face layer material. The fiber based material may comprise or be made of paper. The material may be substantially wood-free or lignin-free. Fiber based material enables providing environmentally friendly and recyclable shelf talker labels.

Transparency may be illustrated as opacity. Opacity is measured using TAPPI-425. Opacity of translucent paper of a face layer 301 may be 10-35%. Opacity of translucent paper of a face layer 301 may be 15-30%. Examples of opacity values of the transparent, semi-transparent or translucent face layer 301 are 20%, 22%, 25%.

The face layer 301 material has sufficient density or basis weight. Basis weight of the face layer 301 may be 55-75 $g/m^2$, or 58-68 $g/m^2$. Other densities or grammages are possible. The basis weight is determined using TAPPI-410. The density has effect on die cutting properties of the material. The face layer 301 may have at least relatively uniform caliper or thickness. Small local deviations, like in order of few percent, are possible. The caliper may comprise 38-76 μm (1.5-3.0 mils). Caliper values are determined using TAPPI-411.

The label may comprise coating 302. An external surface of a face layer 301, with or without coating 302, is printable. Acid free surface is ready to receive print and enables providing good quality print. For example a top coat may be overlaid on a printable surface side of a face layer. Coating 302 may comprise clay, calcium carbonate, chalk, binder, like latex or starch, or chemical additives, like dispersants or resins. In addition or alternatively a paper may be surface treated, like corona- or plasma treated. Coat weight may comprise 0.5-10 $g/m^2$/side, preferably 0.5-5.0 $g/m^2$/side. The paper may comprise two or more coatings, i.e. the paper may be double coated or triple coated. Basis weight of a coated paper, measured according to TAPPI-410, may comprise 58-92 $g/m^2$, for example 60-90 $g/m^2$.

Face layer may comprise coating on one or both of its sides. Coating may be the same or different on opposing sides of the face layer. The coating may be translucent or transparent or semi-transparent. Transparent coating has no effect on transparency of the face paper. The coating may cause relatively small or none increase to the opacity of the face paper. The coated paper is printable. The coating may have effect on surface properties of the paper. The coating may have effect on printability and/or surface gloss and/or smoothness of the paper.

The face layer 301 comprises a (back) surface suitable for receiving adhesive 303, opposite to the printable surface. A face layer of a label has two sides or surfaces, which may be called a front surface side and an adhesive side. The adhesive side of the face layer is compatible with adhesives. Porosity of the surface for receiving adhesive may have effect on adhesive anchorage. Adhesive is not allowed to migrate from an adhesive side of a face layer to its surface side. The face layer material and the adhesive are preferably compatible, or there are no harmful reactions between the material and adhesive. An adhesive side of the face layer lacks any process or treatment preventing anchorage of the adhesive.

Adhesive may comprise removable adhesive. Adhesive may comprise dispersion adhesive, hot melt adhesive, solvent adhesive or emulsion adhesive. Adhesive may be water-based adhesive. Adhesive may be rubber based or acrylic based. Adhesive may comprise ultraviolet (UV) hot melt adhesive. Adhesive may comprise polymers, for example elastic polymers, like latex. Adhesive may comprise clear water-based rubber. Adhesive may be acrylic emulsion adhesive.

Adhesive may comprise clear adhesive. The adhesive may be translucent or bright. Adhesive may have effect on transparency of the label. Adhesive may add some opacity to the label. The label comprising adhesive is still optically transparent, like translucent, transparent or semi-transparent. Smoothness of a surface underlying the adhesive has effect on adhesion. Some amount of surface roughness may promote adhesion. Smoothness of a surface onto which adhesive is to be applied has effect on transparency. Adhesive may mottle according to the surface it is applied on. A smooth surface may enable providing clearer adhesive portion and better transparency compared to a rough surface. The adhesive portion of the shelf talker label is reusable. Thus the label can be attached and detached multiple times.

The used adhesive sustains printing. For example laser printing, flexo printing, thermal transfer printing, monochrome laser printing, or other printing methods. Adhesive may be exposed to a certain heat and pressure during printing operation. The adhesive sustains for example heat and pressure caused during printing. The adhesive maintains its properties during printing. After printing the label, translucent adhesive of the shelf talker label is still usable, for example able to attach the label or activatable.

A coated or non-coated shelf talker label face layer comprising adhesive on one surface and an opposing printable surface is optically transparent. The face layer of the shelf talker label comprises a see-through property. Accordingly, the face layer material, adhesive and possible coating enable optical transparency, or are optically transparent, like translucent, transparent or semi-transparent.

A support layer 304 is adhesively attached to the face layer 301 via adhesive 303. The support layer 304 may comprise a liner material, for example a back paper. The support layer 304 comprise a single layer or a multilayer. The layer 304 may be siliconized. Siliconized surface of the support layer 304 is arranged next to the adhesive 303. The support layer 304 is arranged to form a release liner for an adhesive portion of a shelf talker label. The release liner portion of the support layer 304 is detachably attached to an adhesive portion of the face layer 301. The release liner portion is detachable from the adhesive. The support layer 304 is arranged to form a back portion to non-adhesive portion(s) of a shelf talker label. The back portion of the support layer 304 is permanently attached to the non-adhesive portion of the face layer 301 via adhesive 303.

The non-detachable support layer 304 is arranged to strengthen the shelf talker label or a portion(s) of it. When the label is used, i.e. attached, the back portion provides strength for the freely hanging, non-adhesive portion(s) of a the shelf talker label. The support layer 304 may comprise thickness of 60-200 μm, or 80-180 μm. The support layer attached to the face layer provides rigidity and/or dimensional stability to a freely hanging label, when in use. In use the attached support layer enables providing better visibility and/or non-transparent portion(s). The support layer 304 may be a continuous homogenous layer adhesively attached on a back side of a face layer of shelf talker label sheet. Support layer 304 of a sheet comprising shelf talker labels may be made of homogenous material. The support layer 304 is partly detachable from the adhesive and the face layer. The support layer 304 is detachable from the adhesive portion(s) of the shelf talker label and permanently attached to the other portion(s) of the shelf talker label.

A support layer 304 has effect on runnability during manufacturing and processing. It may positively effect on label manufacturing, printing, die cutting and other process phases. Thickness of the support layer 304 has effect on label strength and/or dimensional stability. One surface of a support layer may be siliconized, at least partly. Silicone hold out may be effected by porosity of the surface. Silicone anchorage is effected by a support layer siliconizable surface. Smoothness of a siliconizable surface has effect on silicone coverage of the surface. Siliconizable surface comprise lack chemicals which may inhibit silicone cure. Material quality may have effect on silicone hold out, which may have effect on release force between the silicone and adhesive.

The structure of the FIG. 3 may be manufactured as a constant web. The different layers, 301, 302, 303, 304, may comprise a single layer or multiple layers. The face layer 301 may be wound to a roll. At least some portions of the support layer 304 may be siliconized. A pattern coating may be utilized for silicone. Lines of silicone may be provided longitudinally along back layer web. Silicone lines may be arranged to face corresponding lines of the face stock, which may be arranged to form the translucent adhesive portion of provided shelf talker labels. Adhesive may be applied on a support layer, which may comprise siliconized and non-siliconized areas or lines. Adhesive side of the support layer is arranged to be attached to the face layer. This may be implemented in a nip. The formed label comprises printable face layer surface. The formed label enables die cutting.

After a roll of label is formed, it can be stored or transported for die cutting and possible pre-printing. Any permanent constant print may be printed onto the face layer printable surface. This pre-print may be made to multiple similar shelf talker labels. A roll of label or a roll of pre-printed label is die cut. Die-cutting may perforate or crease shelf talker labels of certain size from the continuous roll. The label roll for shelf talker labels sustains two-sided die cutting. Die-cutting phase of labeling may be effected via strength and stiffness of the material. These provide ability to die-cut the material. Material thickness deviation, density and/or compressibility in thickness dimension (z-direction) may have effect on die-cutting.

After die cutting roll may still be continuous including pre-cut, detachable shelf talker label portions. A pre-printed label roll may be cut into sheets before or after die-cutting. The roll or sheets are fed to a die-cut station. Die-cutting proceeds at certain speed. The label roll or sheet(s) are strong and stable enough to sustain die-cutting. The label roll or sheet(s) comprise material and/or layers which can be processed and cut on a die-cutting station. The material and/or layers comprise strength in order not to stretch during die-cutting. After die-cutting a continuous roll or a one piece sheet is provided. The die-cut roll or sheet(s) comprise detachable shelf talker labels. Thus properties of parts or layers of the roll or sheet maintain the structure continuous and integral even after the die-cutting.

A shelf talker label roll or sheet is die-cut separately on both sides, two-sided. The label is not die-cut through its layers, but the face layer and the support layer are die-cut separately. Face layer is die-cut to comprise pre-cut edges conforming size and shape of the detachable shelf talker labels. A waste matrix between and next to the labels of the sheet may be removed. The support layer is die-cut such that it comprises pre-cut edges conforming non-detachable support layer attached to the non-tacky information portion of the face layer. Support layer side pre-cuts comprise smaller area compared to the face layer side pre-cuts. Support layer of a label is die-cut along the shape of the non-tacky portion(s) of the label. In case of rectangular labels, the support layer is die-cut at least 1 mm, or at least 1-5 mm, or at least 2-4 mm shorter at each of the straight sides of the rectangle than the corresponding non-tacky face layer portion. The face layer portion and the support layer are co-centric. None of their die-cut lines cross each other. Die-cut lines of the face layer and support layer are separated from each other such that the die-cut lines do not co-join or meet. The die-cut lines of the attached layers are at different places in the area of the label. External dimensions of the support layer are 1-5 mm smaller, or 2-4 mm smaller compared to the external dimensions of the corresponding non-adhesive face layer portion(s). The shelf talker labels can be of different shapes. The support layer is die-cut to conform the shape of the non-tacky face layer portion, and the support layer is typically 1-5 mm, or 2-4 mm smaller on each circumferential edge or external dimension compared to the non-tacky face layer portion.

When a single shelf talker label is removed from a sheet, along die-cut lines, a face layer is removed along its external dimensions with the die-cut support layer portion attached to the non-tacky portion of the face layer. Along the removed die-cut support layer portion all layers are removed from the sheet and the remaining sheet comprises a hole of a size of a die-cut support layer portion. The tacky face layer portion is detached from the support layer of the sheet. The removed shelf talker label may comprise face layer area of 30×60 mm, and support layer area of 29×29 mm, for example. Different sizes are possible.

Die cutting and matrix stripping of labeling process pose some requirements for the layers and materials, at least if effectiveness is desired. A support layer has effect on die cutting and matrix stripping. Its usability as under laying die-cutting requires certain strength and good feeding properties. Density of a liner is high enough for the purpose. A support layer may have uniform thickness, possibly only minimum local deviations. Thickness may provide strength and dimensional stability during manufacturing phases as well as during use. A label shall have certain tensile strength and tear strength both in machine direction, MD, and in cross direction, CD.

A face layer may comprise tear in MD of 10-30 gf (98-294 mN) and in CD of 10-30 gf (98-294 mN), measured as Elmendorf Tear according to TAPPI-414. The unit gram-force is equal to 9.80665 mN.

Face layer may have tensile of 20-40 lbf/in (2.3-4.5 Nm) in MD and 10-20 lbf/in (1.1-2.3 Nm) in CD, measured according to TAPPI-494. The unit pound force inch (lbf/in) corresponds to 0.112984829 Nm.

Face layer may comprise stiffness of 120-200 mgf (1.4-2.0 mN) in MD and 40-80 mgf (0.4-0.8 mN) in CD, measured as Gurley Stiffness according to TAPPI-543. The unit milligram-force is 9.80665 µN.

The die cut, pre-printed sheet of shelf talker labels is printable. Die cutting comprises pre-cuts for detaching single shelf talker labels from the sheet. The die-cut sheet remains smooth and even printable surface(s) enabling printing with a printing machine, for example a laser printer. Ability to print may require certain roughness and ink absorption from a face surface. A printable surface may comprise roughness of 2-30 SU, measured as Sheffield Roughness according to TAPPI-538. Sheffield units (SU) is a numeric value used to assign roughness of a paper. The lower the number the smoother the paper and the higher the number the rougher the paper. A printable surface may comprise gloss of 5-30%, measured as Gloss 75° according to TAPPI-480.

Figure 4A:
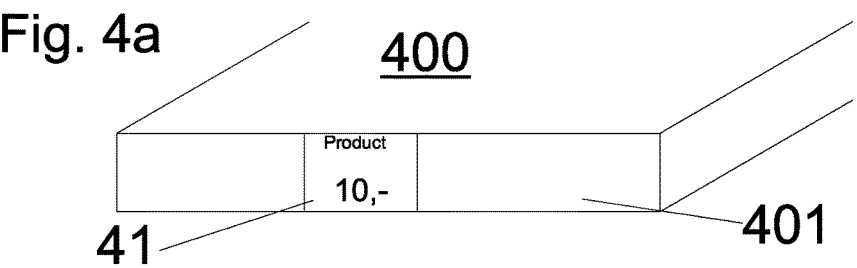
FIG. 4a illustrates information on a side of a shelf.

FIG. 4a illustrates information on a side of a shelf. For example in the stores, information tag 41 is attached on a shelf front edge 401. The information tag 41 shows information on the product on the shelf 400, for example pricing information. When information changes, instead of changing all the tags 41, a shelf talker label can be attached onto the existing tag 41. A sheet of shelf talker labels according to the FIG. 1 may be provided to a store. For example tradespeople or store personnel can order and utilize shelf talker labels. Store personnel may arrange to print desired amount of sheets of the shelf talker labels. The sheets submitted to the store may be pre-printed or contain no print. Any color or graphics may be provided on a printable front surface of a shelf talker label. An end user, like a store personnel, may print any desired variable or updated information on a shelf talker label, or a sheet comprising such. Shelf talker labels may be converted into fan-folded format and an end user may pull the fan-folded material out of a carton, run it through a laser printer, re-fan-fold it into a box and distribute to stores, for example.

Figure 4B:
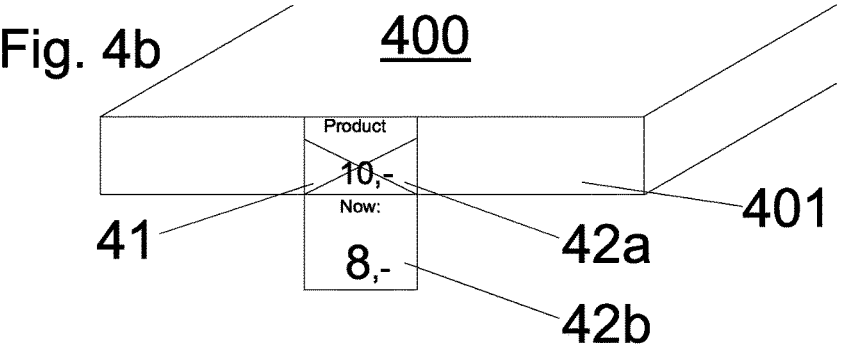
FIG. 4b illustrates a shelf talker label according to an embodiment attached onto a side of a shelf.

FIG. 4b illustrated a shelf talker label according to an embodiment attached on a side of a shelf. The information on the tag 41 has been updated. The updated information has been printed on a shelf talker label according to embodiments. The shelf talker label is attached onto the tag 41. The adhesive portion 42a of the shelf talker label is attached onto the tag 41. The tag 41 is visible through the optically transparent, adhesive portion 42a of the shelf talker label. Non-adhesive portion 42b of the shelf talker label is not transparent, but has opacity. New information is printed on the non-adhesive portion 42b. The portion 42b is hanging freely, as part of the attached shelf talker label, attached via its adhesive portion 42a. The shelf talker labels may be attached manually. The adhesive portion of the label is optically transparent. The adhesive portion is attached onto desired place and the other integral portions of the shelf talker label hang freely. The non-attached, freely hanging portion(s) comprise an attached support layer. Shelf talker labels may provide easy and fast way to constantly update information, for example price information. Further shelf talker labels may provide easy and handy way to publish development of the published information, for example previous price(s) with an updated one.

Figure 4C:
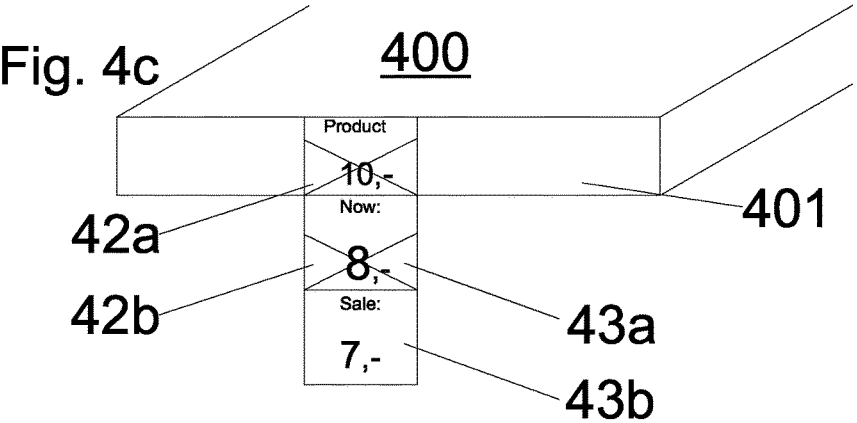
FIG. 4c illustrates a shelf talker label according to an embodiment attached onto a shelf talker label.

FIG. 4c illustrates a shelf talker label according to an embodiment attached to another shelf talker label. A newly updated shelf talker label can be attached to a previous shelf talker label. An adhesive portion of the label 43a can be attached onto the printable face layer 42b of the non-adhesive printable portion of the label. The updated label comprises non-adhesive portion 43b with printed updated information. The shelf talker labels can be chained. New shelf talker label can be attached to the previous one. This way the progress of information, or information history, is visible via the used labels. For example store can update prices and leave the previous price(s) visible for the customers, as illustrated in the FIG. 4c. Size of the chained shelf talker labels, that are attached one on another, is advantageously the same or similar. Also, similar or the same sized portions (adhesive and non-adhesive) of the face layer enable providing clear appearance and optimum attachment of the labels.

Printable translucent label is provided. The label may comprise an optional top coat, a transparent or translucent paper, translucent adhesive and a siliconized liner. The top coat may effect on print quality. For example smoothness and/or toner anchorage may have effect on print quality. Printable surface may be laser receptive. Other printing methods are possible.

Using paper as a face and/or release material of a label has environmental effects. This enables recycling. Use of plastic materials may be reduced or avoided.

According to an embodiment a shelf talker label comprises a face layer and a support layer, wherein the face layer comprises a printable information surface and an adhesive surface, the printable information surface comprises a first information portion and a second information portion, the support layer is adhesively attached to an adhesive surface portion of the face layer opposite to the second information portion, an adhesive surface portion of the face layer opposite to the first information portion is adhesively attachable, and the printable face layer comprises optically transparent, fiber based material.

The shelf talker label according to the embodiment may comprise opacity of the first information portion is 10-30%, or 5-10%, or 3-5% smaller than opacity of the second information portion.

The shelf talker label according to embodiment(s) may comprise the second information portion of the face layer comprising printing or background printing, which printing or background printing is optionally coloured.

The shelf talker label according to embodiment(s) may comprise the adhesive surface portion of the face layer opposite to the second information portion comprising coloured adhesive.

The shelf talker label according to embodiment(s) may comprise the second information portion of the face layer and the support layer attached to it, which comprise substantially similar shape and external dimensions differing of 1-5 mm, or 2-4 mm.

The shelf talker label according to embodiment(s) may comprise the first information portion comprising 5-50% of the printable information surface and the second information portion comprising 50-95% of the printable information surface.

The shelf talker label according to embodiment(s) may comprise the face layer comprising transparent paper or translucent paper.

The shelf talker label according to embodiment(s) may comprise the face layer comprising paper comprising opacity of 10-35%, measured according to TAPPI-425.

The shelf talker label according to embodiment(s) may comprise the support layer being attached to the face layer via adhesive, wherein the adhesive comprises transparent, translucent or semi-transparent adhesive.

The shelf talker label according to embodiment(s) may comprise the support layer being attached to the face stock via adhesive, wherein the adhesive comprises acrylic emulsion adhesive.

The shelf talker label according to embodiment(s) may comprise the shelf taker label being die-cut so that the face layer is die-cut conforming with the area of the printable information surface, and the support layer, adhesively attached to the face layer, being die-cut conforming the second information area of the printable information surface.

The shelf talker label according to embodiment(s) may comprise the die-cut line of the face layer being separated from the die-cut line of the support layer of the same shelf talker at least by of 1-5 mm, or 2-4 mm.

The shelf talker label according to embodiment(s) may comprise a laser printable front surface.

According to an embodiment a laser printable shelf talker label sheet comprises one or more removable shelf talker labels, wherein the shelf talker label sheet comprises a printable face layer laminated to a support layer, the shelf talker label sheet comprises one or more die cut removable shelf talker labels, and the one or more shelf talker labels comprise at least the printable face layer comprising a first information portion and a second information portion, the support layer being adhesively attached to the face layer portion corresponding to the second information portion, the support layer portion being detachably attached to the face layer portion corresponding to the first information portion, and the printable face layer comprising optically transparent, fiber based material.

The shelf talker label sheet according to the embodiment may comprise opacity of the first information portion is 10-30%, or 5-10%, or 3-5% smaller than opacity of the second information portion.

The shelf talker label sheet according to embodiment(s) may comprise the second information portion of the face layer comprising printing or background printing, which printing or background printing is optionally coloured.

The shelf talker label sheet according to embodiment(s) may comprise the adhesive surface portion of the face layer opposite to the second information portion comprising coloured adhesive.

The shelf talker label sheet according to embodiment(s) may comprise the second information portion and the corresponding portion of the support layer, attached to the second information portion, comprising substantially similar shape and external dimensions differing of 1-5 mm, or 2-4 mm.

The shelf talker label sheet according to embodiment(s) may comprise the first information portion comprising 5-50% of the printable information surface and the second information portion comprising 50-95% of the printable information surface of the shelf talker label.

The shelf talker label sheet according to embodiment(s) may comprise the face layer comprising transparent paper or translucent paper.

The shelf talker label sheet according to embodiment(s) may comprise the face layer comprising paper comprising opacity of 10-35%, measured according to TAPPI-425.

The shelf talker label sheet according to embodiment(s) may comprise the support layer being attached to the face layer via adhesive, wherein the adhesive comprises transparent, translucent or semi-transparent adhesive.

The shelf talker label sheet according to embodiment(s) may comprise the support layer attached to the face stock via adhesive, wherein the adhesive comprises acrylic emulsion adhesive.

The shelf talker label sheet according to embodiment(s) may comprise the shelf talker labels being die-cut so that the face layer is die-cut conforming with the area(s) of the printable information surface(s) of a single shelf talker label(s), and the support layer, adhesively attached to the face layer, being die-cut conforming the second information area(s) of the printable information surface(s) of the single shelf talker label(s).

The shelf talker label sheet according to embodiment(s) may comprise the die-cut line of the face layer being separated from the die-cut line of the support layer of the same shelf talker at least by of 1-5 mm, or 2-4 mm.

The shelf talker label sheet according to embodiment(s) may comprise a laser printable face layer front surface.

The shelf talker label sheet according to embodiment(s) may comprise the printable face layer comprising transparent paper or translucent paper.

An embodiment comprises a roll of label comprising a face layer and a support layer, wherein the roll of label is arranged to be die-cuttable, the roll of label comprises a printable face layer laminated to a support layer via adhesive, and the printable face layer comprises optically transparent, fiber based material.

The roll of label according to the embodiment may comprise the printable face layer being partly adhesive attached to the support layer and partly detachably attached to the support layer.

An embodiment comprises use of a printable, optically transparent, fiber based material as a face layer of a shelf talker label.

The invention claimed is:

1. A roll of label comprising a face layer and a support layer, wherein
   the roll of label is arranged to be die-cuttable,
   the roll of label comprises a printable face layer comprising a first information portion and a second information portion laminated to a support layer via adhesive, and
   the printable face layer comprises optically transparent, fiber based material having an opacity of 15 to 30%, as determined according to TAPPI-425;
   wherein the first information portion and the second information portion of the printable face layer have different opacities; and
   wherein opacity of the first information portion is 10-30%, or 5-10%, or 3-5% smaller than opacity of the second information portion.

2. A roll of label according to the claim 1, wherein the printable face layer is partly adhesive attached to the support layer and partly detachably attached to the support layer.

3. A shelf talker label comprising a face layer and a support layer, wherein
   the face layer comprises a printable information surface and an adhesive surface,
   the printable information surface comprises a first information portion and a second information portion,
   the support layer is adhesively attached to an adhesive surface portion of the face layer opposite to the second information portion,
   an adhesive surface portion of the face layer opposite to the first information portion is adhesively attachable, and
   the printable face layer comprises optically transparent, fiber based material having an opacity of 15 to 30%, as determined according to TAPPI-425,
   wherein the first information portion and the second information portion of the printable information surface have different opacities; and
   wherein opacity of the first information portion is 10-30%, or 5-10%, or 3-5% smaller than opacity of the second information portion.

4. A shelf talker label according to the claim 3, wherein the second information portion of the face layer comprises printing or background printing, which printing or background printing is optionally coloured.

5. A shelf talker label according to the claim 3, wherein the adhesive surface portion of the face layer opposite to the second information portion comprises coloured adhesive.

6. A shelf talker label according to the claim 3, wherein the second information portion of the face layer and the support layer attached to it comprise substantially similar shape and external dimensions differing of 1-5 mm, or 2-4 mm.

7. A shelf talker label according to the claim 3, wherein the first information portion comprises 5-50% of the printable information surface and the second information portion comprises 50-95% of the printable information surface.

8. A shelf talker label according to the claim 3, wherein the support layer is attached to the face layer via optically transparent adhesive, wherein optionally the adhesive comprises acrylic emulsion adhesive.

9. A shelf talker label according to the claim 3, comprising a laser printable front surface.

10. A shelf talker label according to claim 3, wherein opacity of the printable face layer is implemented by color printed uniformly across a surface of the printable face layer.

11. A shelf talker label according to claim 3, wherein opacity of the first information portion is uniform across the first information portion, and opacity of the second information portion is uniform across the second information portion.

12. A laser printable shelf talker label sheet comprising one or more removable shelf talker labels, wherein
   the shelf talker label sheet comprises a printable face layer laminated to a support layer,
   the shelf talker label sheet comprises one or more die cut removable shelf talker labels, and
   the one or more shelf talker labels comprise at least
   the printable face layer comprising a first information portion and a second information portion,
   the support layer being adhesively attached to the face layer portion corresponding to the second information portion,
   the support layer portion being detachably attached to the face layer portion corresponding to the first information portion, and
   the printable face layer comprising optically transparent, fiber based material having an opacity of 15 to 30%, as determined according to TAPPI-425,
   wherein the first information portion and the second information portion of the printable face layer have different opacities; and
   wherein opacity of the first information portion is 10-30%, or 5-10%, or 3-5% smaller than opacity of the second information portion.

13. A shelf talker label sheet according to the claim 12, wherein the second information portion of the face layer comprises printing or background printing, which printing or background printing is optionally coloured.

14. A shelf talker label sheet according to the claim 12, wherein the adhesive surface portion of the face layer opposite to the second information portion comprises coloured adhesive.

15. A shelf talker label sheet according to the claim 12, wherein the second information portion and the corresponding portion of the support layer, attached to the second information portion, comprise substantially similar shape and external dimensions differing of 1-5 mm, or 2-4 mm.

16. A shelf talker label sheet according to the claim 12, wherein the first information portion comprises 5-50% of the printable information surface and the second information portion comprises 50-95% of the printable information surface of the shelf talker label.

17. A shelf talker label sheet according to the claim 12, wherein the face layer comprises transparent paper or translucent paper.

18. A shelf talker label sheet according to the claim 12, wherein the support layer is attached to the face layer via adhesive, wherein the adhesive comprises transparent, translucent or semi-transparent adhesive.

19. A shelf talker label sheet according to the claim 12, wherein the support layer is attached to the face stock via adhesive, wherein optionally the adhesive comprises acrylic emulsion adhesive.

20. A shelf talker label sheet according to the claim 12, wherein the shelf talker labels are die-cut so that the face layer is die-cut conforming with the area(s) of the printable information surface(s) of a single shelf talker label(s), and the support layer, adhesively attached to the face layer, is die-cut conforming the second information area(s) of the printable information surface(s) of the single shelf talker label(s).

21. A shelf talker label sheet according to the claim 20, wherein the die-cut line of the face layer is separated from the die-cut line of the support layer of the same shelf talker at least by of 1-5 mm, or 2-4 mm.

22. A shelf talker label sheet according to the claim 12, comprising a laser printable face layer front surface.

23. A shelf talker label sheet according to the claim 12, wherein the printable face layer comprises transparent paper or translucent paper.

* * * * *